Nov. 1, 1938.   J. R. BURCH   2,134,682
POPCORN MACHINE
Filed July 25, 1936   2 Sheets-Sheet 1

INVENTOR
Julian R. Burch.
BY
ATTORNEY

Nov. 1, 1938.　　　　J. R. BURCH　　　　2,134,682

POPCORN MACHINE

Filed July 25, 1936　　　2 Sheets-Sheet 2

INVENTOR
Julian R. Burch.
By
ATTORNEY

Patented Nov. 1, 1938

2,134,682

UNITED STATES PATENT OFFICE 2,134,682

POPCORN MACHINE

Julian R. Burch, St. Louis, Mo.

Application July 25, 1936, Serial No. 92,529

6 Claims. (Cl. 219—44)

This invention relates to a certain new and useful improvement in popcorn machines.

My invention has for its primary object the provision, in a machine of the character described, of a popping kettle incorporating means for thermostatically controlling the temperature of the kettle.

My invention has for another of its objects the provision, in a machine of the character described, of a swingable popping kettle latchingly supported and provided with means integrally incorporated with the kettle-structure for thermostatically controlling the temperature of the kettle and for automatically signalling when the temperature of the kettle has reached a selected degree.

My invention has for still another object the provision, in a machine of the character described, of a popping kettle having a plurality of vent-means uniquely disposed for non-interference with the moving parts of the machine.

And with the above and other objects in view, my invention resides in the novel features of form, construction, arrangement, and combination of parts presently described and pointed out in the claims.

In the accompanying drawings (two sheets)—

Figure 1:
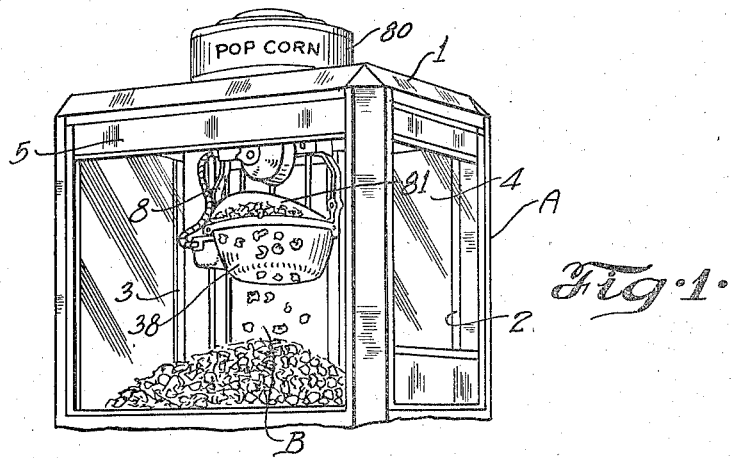
Figure 1 is a perspective view, on a reduced scale, of a corn-popping machine of my invention, the lower portion of the enclosing cabinet or shell thereof being broken away.

Referring now more in detail and by reference characters to the drawings, which illustrate a preferred embodiment of my invention, A designates a cabinet or shell, the upper portion thereof only being shown, the cabinet having a top wall 1, side and back walls 2, 3, and 4, respectively, and a front wall 5, which, suitably joined or connected together, form a housed-in popping chamber B for the popcorn machine.

Disposed centrally of, and horizontally across, the top of the popping chamber B in a plane slightly below the top wall 1, is preferably a channel-iron member 6, best seen in Figure 4, from which the popping kettle 7 and its associated mechanism are dependingly supported.

Vertically downwardly extending from the under side of the support 6, is a rigid kettle hanger 8, which includes a preferably integrally formed housing 9 and a pair of opposed arms 10 and 11, horizontally extending between the lower extremities of which latter is a preferably integrally formed cross-member 13, in turn, provided with a centrally disposed opening 14 through which an agitator shaft 15 rotatably projects for operation in the kettle 7.

The cross-member 13 is suitably provided with a pair of spaced openings 16 and 17 for receiving vertically disposed vent pipes 18 and 19, respectively, which are connected through elbows 20 and 21, respectively, to horizontal vent pipe sections 22 and 23, respectively, which latter are, in turn, connected to vertical outlet pipes 24 and 25, respectively, opening at their extremities to atmosphere.

Preferably integrally formed with and downwardly extending from the cross-member 13 beneath arm 11, is a pivot-shoulder 26, juxtaposed to which, on the lower portion of the arm 10 for cooperation with a detent 28 and a releasing member 29 operatively mounted on the kettle 7, is a kettle latch assembly 27, the latch assembly 27, detent 28, and releasing member 29 being constructed and operating substantially in accordance with the disclosures and claims of Letters Patent No. 1,961,812, issued to me on June 5, 1934.

The kettle 7 is provided with a preferably integrally formed shoulder 30, through the upper portion of which is disposed a pin 31 for pivotal engagement with the pivot-shoulder 26. Rigidly mounted on, and downwardly extending from, the shoulder 30 of the kettle 7, is a thermostatic control switch 32, presently more fully described, which is electrically connected on its one side through a multi-wire flexible cable 33 to the electrical circuits disposed in the housing 9, and is electrically connected on its other side to a heating element 34, which is rigidly held against the bottom of the kettle 7 by a plate 35, which, in turn, is rigidly held in place by suitable screw members 36, 37.

A shell or kettle housing 38 is rigidly mounted around the bottom and outside of the kettle 7 and is held in position by a plurality of cap-screws 39, which threadingly engage the bottom plate member 35, thus completely enclosing the electrical elements of the kettle and protecting the same from exposure to grease, dirt, and other harmful agents.

Figure 2:
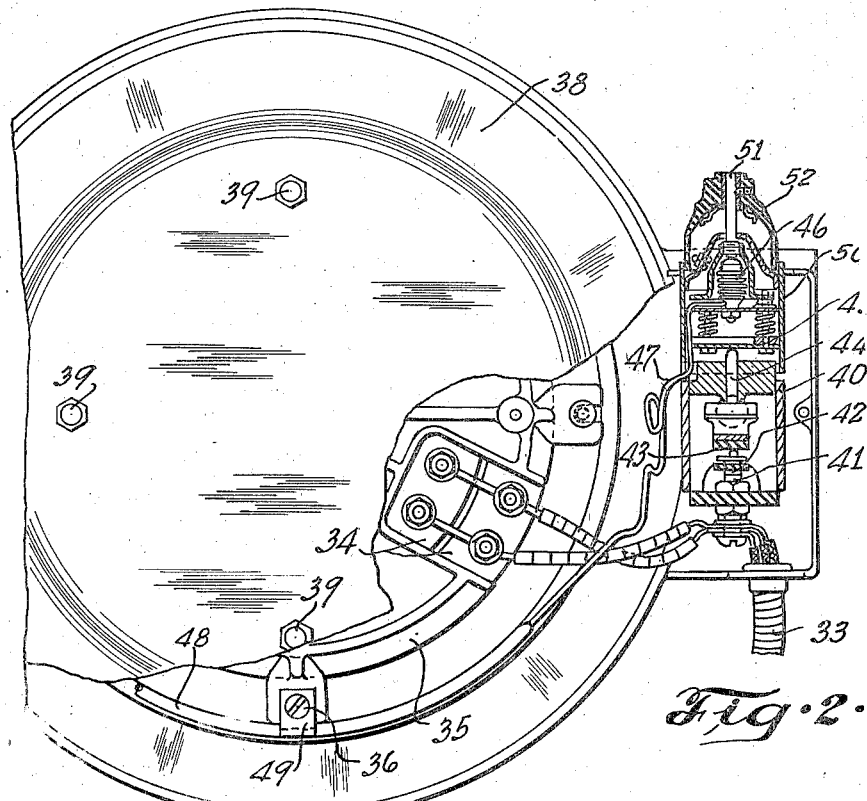
Figure 2 is a fragmentary horizontal sectional view of the corn popping kettle and its associated parts taken approximately along the line 2—2, Figure 4.

The thermostat control element, as best seen in Figure 2, comprises an integral frame or housing 40, in which is operably mounted a contact-point 41 and a flexible switch arm 42. At the free extremity of the flexible switch arm 42, is another contact point 43 for circuit completing engagement with the contact-point 41. The contact-arm 42 is shifted or moved into and out of engagement with the contact-point 41 by means of a reciprocable pin 44, which is actuated by a floating plate 45, which is normally spring-pressed into a forward position, so that the plunger or pin 44 will, in turn, normally force the contact arm 42 and the contact point 43 thereon into circuit closing engagement with the contact point 41.

The floating plate 45 is rigidly attached to one end of a metallic diaphragm 46, which is operably connected through a small conduit pipe 47 to a temperature element 48 rigidly mounted against the bottom of the kettle 7 by means of the brackets 49, the diaphragm 46, conduit 47 and temperature element 48 forming a closed system charged with a suitable temperature-responsive fluid.

The metallic diaphragm-floating plate assembly of the thermostat is movably disposed in a casing 50, which is mounted on the housing 40. A threaded shaft 51, fixed at an end in a graduated knob 52, is rotatably mounted in the shell 50 and operably engages the metallic diaphragm 46 in such manner as to move or shift the diaphragm-floating plate assembly toward or away from the housing 40 responsive to longitudinal translation of the threaded shaft 51.

As the temperature of the kettle increases, the fluid contained in the tube 48, the conduit 47, and the diaphragm 46 will expand, thereby causing the diaphragm 46 to enlarge and draw the floating plate 45 backwardly away from the housing 40, thereby moving the contact arm 42 and its associated contact point 43 away from the contact point 41 and breaking the circuit.

It will noted that, by rotating the knob 52, the diaphragm-floating plate assembly may be moved within the shell 50 to various selected positions, from which greater or lesser movement will be required for circuit breaking. Thus, obviously, the amount of expansion in the diaphragm system and consequently the temperature at which the circuit will be broken may be adjustably set.

In the housing 9, is mounted a small incandescent lamp 53 preferably having a load value of six watts or less. Also mounted in the housing 9, is a switch 54, and preferably disposed in one end of the housing 9 is a female element 55 of a three-wire separable plug, the male element 56 of which is mounted on the free end of the flexible multi-wire cable 33. Finally, a conventional electric motor 57 is rigidly mounted on the housing 9 and is connected through a conventional train of gears for driving the agitator 14.

Figure 3:
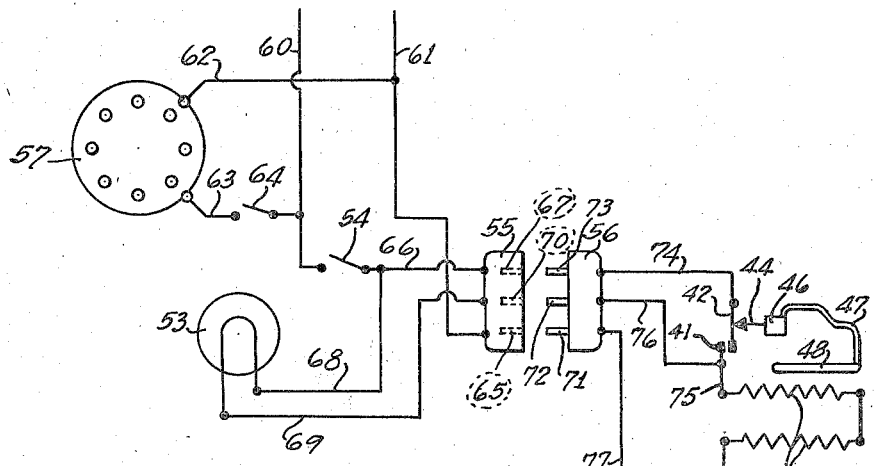
Figure 3 is a schematic wiring diagram showing the electrical circuits employed in the heating and controlling devices associated with the corn popping kettle.

The electrical circuits, connecting the various elements above described, may best be seen by reference to Figure 3. A pair of lead-in wires 60 and 61 are connected to some conventional source of power (not shown). The motor 57 is connected across the leads 60 and 61 through lines 62 and 63, a suitable switch 64 being inserted preferably in the line 63. The lead 61 is connected directly to the contact member 65 in the female separable plug member 55. The lead 60 is connected to one side of the switch 54, the other side of the switch 54 being connected by the line 66 to another contact member 67 in the female separable plug member 55. Connected to the line 66, is the lead 68, which is connected to one terminal of the incandescent lamp 53, whose other terminal is connected by the lead 69 to a third contact member 70 of the female separable plug member 55. Contact blades 71, 72, and 73 are mounted in the male element 56 of the separable plug and are adapted to make electrical contact with the contact members 65, 70, and 67, respectively, in the female element of the separable plug 55 when the two elements of the separable plug are connected together. The contact blade 71 is connected by a lead 77 directly to one terminal of the heater elements 34. The contact blade 73 is connected by the lead 74 to the contact arm 42. The contact point 41 is connected by a lead 75 to the other terminal of the heating elements 34. The thermostat control is diagrammatically indicated at 44, 46, 47, and 48 to show the physical connection between the thermostatic control member and the contact arm 42 for actuating said contact arm responsively to the temperature of the heater elements 34, as has been previously described.

Thus, it will be seen that the motor 57 may be energized by closing the switch 64, thereby actuating the agitator member 15. Likewise, the switch 54 may be closed, thus completing the circuit to the heater elements 34. Since the kettle 7 is initially cold, the thermostatic control element will hold the contact-arm 42 in circuit completing position, as above described. Thus, the current will flow into the heater elements 34 and heat the kettle. The incandescent lamp 53 is, in effect, connected across the line 66, so that, when the current is flowing from the lead 66 through the contact-arm 42 and the lead 75 to the heater elements 34, no current will flow into the lamp 53. When the temperature of the kettle 7 reaches the point at which the thermostatic control is set, the circuit will be broken and no further heating of the kettle 7 will occur. At this time, the current will flow from the switch 54 through the lead 68 to one side of the lamp 53, while the other side of the lamp 53 will be electrically connected through the lead 69 and the lead 76 through the heater elements 34 to the lead 73, which is, in turn, connected to the main lead-in connection or wire 61, thus completing a circuit to the lamp 53, whereby the lamp 53 will be energized. Since the lamp 53 has a very low load value, such as six watts, for instance, while the heater elements 34 have a very high load value, such as 2200 watts, for instance, the lamp 53 will draw so little current through the heating elements 34, when the circuits are in lamp lighting arrangement, that the heating elements 34 will give off no measurable amount of heat and will instead act more or less as an electrical conductor in the lamp lighting circuit. When the temperature of the kettle 7 drops to such a point that the thermostat will move the contact-arm 42 into circuit closing position, the current will again flow through the lead 66 directly to the heating elements 34 and, in effect, "by-pass" around the incandescent lamp 53, whereupon the lamp 53 will cease to burn.

As the popcorn is popped in the kettle, it increases in size and gives off some steam and smoke. It has, therefore, been found desirable, although not necessary, to provide a pair of semi-circular plate members (such as that shown at 81 in Figure 1) hingedly connected to the support and adapted to lie in the plane of the top of the kettle, providing a removable closure for the top of the kettle. These plates can be suitably weighted so that, as the popping corn in the kettle increases in volume, it will be necessary for the corn to exert a predetermined amount of upward pressure against the lid members in order to force them open.

In operation, the knob 52 on the thermostatic control is rotated so as to set the thermostatic control for a desired temperature, preferably 450° F., as indicated on the graduated scale thereof. As soon as the temperature of the kettle 7 has reached the desired temperature, the thermostat will operate to shut off the current and turn on the lamp 53, as above described, thereby indicating that the kettle 7 is ready for popping operation, at which time a suitable quantity of popcorn may be placed in the kettle 7 and the agitator 15 turned on by closing the switch 64 to the motor 57. The agitation is continued and the popcorn thus circulated about in the kettle 7 until the corn is fully popped, the thermostat meanwhile operating to maintain the temperature of the kettle at the desired point.

Figure 4:
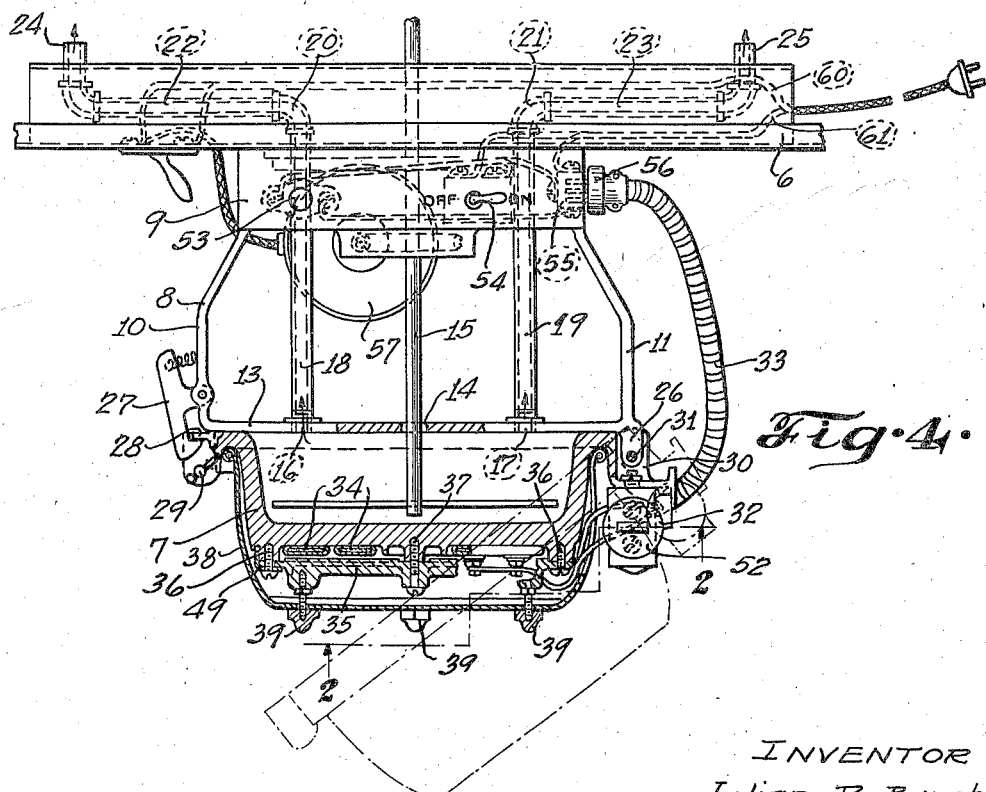
Figure 4 is a vertical sectional view of the corn popping kettle and its associated parts taken right-angularly to Figure 2.

When the popping operation is completed, the latch assembly 27 is disengaged from the detent member 28 by manually operating the latch release mechanism 29, whereupon the entire kettle 7 and its associated parts will swing downwardly about the pivot pin 31 to the position shown in dotted lines in Figure 4 for discharging the finished popcorn into the bottom of the popping chamber B.

The present invention thus provides a new and unique type of popcorn machine in which the kettle may be pivotally swung to discharge the contents thereof readily and easily, and, at the same time, afford an entire thermostatic control assembly mounted on and movable with the kettle in such a way that there will be no danger of breakage or wear in the thermostat assembly. The present invention also provides a new and improved popcorn machine in which signalling means is provided for indicating the exact time at which the kettle is ready for the popping operation. Thus, popcorn machines, made in accordance with the present invention, are economical, easy to operate, and use a minimum quantity of electricity. Guesswork and waste are eliminated, inasmuch as popcorn is placed in the kettle exactly at the proper time and temperature, resulting thereby in less burnt seasoning and poorly popped corn, and makes it possible for even an inexperienced operator to prepare delicious, crisp popcorn and do so uniformly with each successive batch.

The agitator shaft 15 may be extended upwardly through the channel support member 6 and the top wall 1 and a rotatable advertising sign 80 rigidly mounted thereon. The vent pipes 18 and 19 are connected, as above described, to the outlet pipes 24 and 25, respectively, so that the vent outlets will be radially displaced a sufficient distance away from the agitator shaft 15, thereby avoiding any interference with the rotating advertising sign 80.

It will be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. In a popcorn machine, in combination, a support, a kettle having a shoulder on its peripheral edge, means on the support for pivotally engaging the shoulder, a heating element mounted on the kettle, and diaphragm-operated control means for thermostatically controlling the temperature of the heating means, said control means being mounted rigidly on the shoulder and having a gas-filled tube mounted rigidly on the kettle.

2. In a popcorn machine, in combination, a support, a kettle having an integrally formed shoulder on and extending radially outwardly from its peripheral edge, means on the support for pivotally engaging the shoulder, a heating element mounted on the kettle, diaphragm-operated control means mounted on the shoulder having operatively connected thereto a gas-filled tube mounted rigidly on the kettle, for thermostatically controlling the temperature of the heating means, detent means rigidly formed on the peripheral edge of the kettle diametrically opposite the shoulder, and releasable latch means on the support for releasably engaging the detent means.

3. In a popcorn machine, a unitary bracket member including an upper horizontally disposed box-like housing, a pair of downwardly extending arms, and a lower cross-member extending horizontally therebetween, one of said arms having a pivot shoulder formed adjacent its lower extremity, the other of said arms having a spring-actuated detent catch operatively mounted adjacent its lower extremity, and a kettle swingably suspended from the pivot shoulder at a point adjacent its upper peripheral edge and having a detent shoulder formed on its upper peripheral edge in diametric juxtaposition to the point of suspension for engagement with the detent catch.

4. In a popcorn machine, in combination, a support, a kettle having an integrally formed shoulder on and extending radially outwardly from its peripheral edge, pivot-forming means on the support for pivotally engaging the shoulder, a heating element mounted in the kettle, diaphragm-operated thermostatic control means mounted on the shoulder and spaced away from the body of the kettle to provide for free circulation of air between the control means and the kettle, and a gas-filled thermostat actuating element mounted rigidly on the kettle adjacent the heating element.

5. In a popcorn machine, in combination, a support, a kettle having an integrally formed shoulder on and extending radially outwardly from its peripheral edge, pivot-forming means on the support for pivotally engaging the shoulder, a heating element mounted in the kettle, diaphragm-operated thermostatic control means mounted on the shoulder and spaced away from the body of the kettle to provide for free circulation of air between the control means and the kettle, a gas-filled thermostat actuating element mounted rigidly on the kettle adjacent the heating element, detent means rigidly formed on the peripheral edge of the kettle diametrically opposite the shoulder, and releasable latch means on the support for releasably engaging the detent means.

6. In a popcorn machine, in combination, a support, a kettle having an integrally formed shoulder on and extending radially outwardly from its peripheral edge, pivot-forming means on the support for pivotally engaging the shoulder, a heating element mounted in the kettle, diaphragm-operated thermostatic control means mounted on the shoulder adjacent the pivot-forming means and spaced away from the body of the kettle to provide for free circulation of air between the control means and the kettle, and a gas-filled thermostat actuating element mounted rigidly on the kettle adjacent the heating element.

JULIAN R. BURCH.